United States Patent [19]

Robinson et al.

[11] 3,960,825

[45] June 1, 1976

[54] HIGH-MODULUS THERMOPLASTIC ETHYLENE-TETRAFLUOROETHYLENE HEXAFLUOROPROPENE TERPOLYMERS

[75] Inventors: Donald Nellis Robinson, Collegeville; Charles Benjamin Welsh, Blue Bell, both of Pa.

[73] Assignee: Pennwalt Corporation, Philadelphia, Pa.

[22] Filed: Oct. 15, 1973

[21] Appl. No.: 406,753

[52] U.S. Cl. ................................ 526/206; 526/252; 526/352
[51] Int. Cl.[2] ................ C08F 210/02; C08F 214/24
[58] Field of Search ................ 260/80.77; 450/722.5

[56] References Cited
UNITED STATES PATENTS

| | | | |
|---|---|---|---|
| 2,468,664 | 4/1949 | Hanford | 260/86 |
| 2,773,781 | 12/1956 | Rodman | 117/138.8 |
| 3,163,628 | 12/1964 | Bolstad | 260/87.5 |
| 3,531,441 | 9/1970 | Stilmar | 260/78.5 |
| 3,738,923 | 6/1973 | Carlson et al | 204/159.2 |

Primary Examiner—Stanford M. Levin

[57] ABSTRACT

A tough, flexible, nonelastic, high-modulus terpolymer composed of copolymerized units, in mole percents, of 45 to 55% ethylene, 40 to 50% tetrafluoroethylene and 3 to 9% hexafluoropropylene.

16 Claims, No Drawings

HIGH-MODULUS THERMOPLASTIC ETHYLENE-TETRAFLUOROETHYLENE HEXAFLUOROPROPENE TERPOLYMERS

This invention concerns a high-modulus terpolymer of ethylene, tetrafluoroethylene, and hexafluoropropene. More particularly, this invention concerns a tough, flexible, nonelastomeric, high molecular weight thermoplastic resin composed of copolymerized units of 45 to 55% ethylene, 40 to 50% tetrafluoroethylene and 3 to 9% hexafluoropropylene, the total of the three constitutents being 100%. (The proportions of the monomeric components of the copolymers embodied herein are given in molar percents thereof unless otherwise noted.)

Various copolymers of ethylene with fluorinated olefins are known in the art. For example, Hanford et al. U.S. Pat. No. 2,468,664, discloses a copolymer of tetrafluoroethylene and ethylene in which the tetrafluoroethylene is 5% to 95% of the combined weight of the two constituents. British Pat. No. 1,166,020 concerns a crystalline copolymer of ethylene and tetrafluoroethylene containing 53 to 63 mole percent tetrafluoroethylene. Ethylenetetrafluoroethylene copolymers are also disclosed by U.S. Pat. No. 3,528,954. German Pat. No. 1,957,963 discloses copolymers of ethylene and tetrafluoroethylene with a third monomer, either perfluoropropyl perfluorovinyl ether or perfluoroisopropyl allyl ether. The polymers disclosed by these references are elastomeric, i.e., having a breaking elongation of 511% and extremely low tensile strength, on the order of 760 psi., in contrast to the nonelastic polymers of this invention. German Pat. No. 2,233,288 discloses a terpolymer of ethylene, tetrafluoroethylene and hexafluoropropene in which there is 2 – 30 mole % hexafluoroprene in the feed monomers mixture and in which there is a large ratio of tetrafluoroethylene to ethylene, i.e., greater than 2.35. These terpolymers have low tensile strength and poor molding and extrusion characteristics. In the copending application of Donald N. Robinson, Ser. No. 308,073, filed Nov. 20, 1972, now U.S. Pat. No. 3,817,951 is described a terpolymer composed of copolymerized units of from 40% to 60% ethylene, 20% to 30% tetrafluoroethylene, and 10% to 30% hexafluoropropylene, which terpolymer is a transparent and amorphous (non-crystalline), nonelastic, low-modulus, soft and flexible, thermally stable, high molecular weight thermoplastic having a relatively low softening point, i.e., within the range of about 115° to 160°C.

The composition of the present invention is, in contrast, a tough, high-modulus, high-melting point, partially crystalline, nonelastic, translucent, thermally stable, high molecular weight, thermoplastic terpolymer composed of copolymerized units of 45 to 55% ethylene (Et), 40 to 50% tetrafluoroethylene (TFE) and from 3 to 9% hexafluoropropylene (HFP), the total of said constituents in the terpolymer being 100%. The preferred terpolymers, with regard to having the highest relative melting points, contain from 3 to 6% hexafluoropropylene; however, those with the best overall properties have at least 4% hexafluoropropylene. The combined amount of tetrafluoroethylene and hexafluoropropylene in the terpolymer will be, in general, for the best balance of physical properties, from about 48 to 52%.

The molecular weights of the terpolymers embodied herein are gauged by determining the "plasticity number" which is an empirical index relaing to melt flow. The plasticity number is the area in square millimeters of a film made by placing 0.5 gram of particulate polymer piled in a cone between aluminum sheets and the platens of a Carver Press. The platens are brought together to compress the powder under slight pressure (less than 50 psi), and the powder is preheated in this manner at 300°C for 2 minutes. A pressure of 3000 psi is then applied for 60 seconds at this temperature. The greater the area of the polymer plaques so produced, the lower the molecular weight of the polymer, and conversely. The terpolymers embodied herein have plasticity numbers in the range of about 2000 to 9000 $mm^2$ and preferably 3000 to 6000 $mm^2$. Such terpolymers may be readily processed in the Brabender Plastograph. Melt viscosity can be determined and smooth extrudates obtained in a capillary rheometer at 300°C. In fact, molecular weights may also be gauged by determining melt viscosity in the capillary rheometer at 300°C.

The flexibility of polymers is normally measured by their modulus value, that is, the load in pounds per square inch of initial cross-sectional area necessary to produce a stated percentage elongation, and which value is determined herein by ASTM Method D1530-58T. The terpolymers of this invention have a relatively high modulus, which is, in general, in the range of $1 \times 10^5$ to $2 \times 10^5$ psi.

Tensile yield strength, tensile break strength, and elongation are measured according to ASTM Method D1708-59T, using an Instron Model No. TM, Series No. 1785 tensile testing machine. The tensile yield strength and tensile break strength of the terpolymers embodied herein will be in the range of about 2500 to 4000 and about 6000 to 9000 psi, respectively. Elongation at break is in the range of about 200 to 400%. The terpolymer of this invention is a very tough thermoplastic, toughness being defined as the product of tensile break strength times the elongation. The extreme toughness is also demonstrated by the terpolymer's high impact strength, in the range of about 600 to 900 ft-lbs./$in^2$ as measured by ASTM Method D256-56. Toughness is further shown by determining the "Penetration Temperature", i.e. the thermomechanical strength, as measured using a Perkin-Elmer Thermomechanical Analyzer, Model TMS-1. The penetration temperatures of the tough terpolymers of this invention are quite high, on the order of about 220 to 250°C for 0.5 mil penetration and 100 g. load.

Other valuable thermal properties of the thermoplastic terpolymer embodied herein are its high melting point, ranging from about 240° to 285°C, and softening point, ranging from about 200° to 250°C. Melting point is a sharp temperature range where crystalline portions of the polymer melt, giving rise to an endotherm (absorption of heat) which is measured by a differential scanning colorimeter (DSC) and is visually observed as a peak on the recorder at a specific temperature.

Softening point is a less specific temperature range at which the polymer no longer supports a given load. This softening point is measured by a thermomechanical analyzer (TMA) which plots penetration of a probe into a plastic sample versus temperature. The softening point may be reported at any given load on the probe and at any penetration. Thus, it is subject to variation, depending on the load and penetration selected by the analyst. In the present case, the load is 100g. and the penetration is 0.5 mil.

As mentioned previously, the terpolymer of this invention is partially crystalline, the degree of crystallinity being measurable by a Differential Scanning Calorimeter in which the "DSC" value or extent of crystallinity of the polymer is measured by the area under the DSC endotherm curve area, expressed in cal./g. units. The larger the area, the higher percent crystallinity. It has been observed that the ethylene-tetrafluoroethylene-hexafluoropropylene terpolymers have less crystallinity than ethylene-tetrafluroethylene copolymers.

The thermal stability of the terpolymer of this invention is excellent. For example, weight loss after two weeks at 200°C. is less than 1%. Color stability of the terpolymer at 270°C. is fair to excellent. Thermogravimetric analysis (TGA) indicates that temperatures greater than 360°C. are required to cause a weight loss of at least 20%.

The terpolymer of this invention is surprisingly resistant to chemical and solvent attack, being unaffected by typical common solvents including carbon tetrachloride, benezene, acetone, ethyl alcohol and chlorofluorocarbons, such as trichlorotrifluoroethane, both at ambient and elevated temperatues. Tests with a large number of representative solvents do not reveal a solvent which, at 25°C., has a solvating effect on the terpolymer.

The terpolymer of this invention is a nonpolar material having a low dielectric constant which accounts for its good electrical insulating properties. The terpolymer has excellent low temperature properties, retaining complete flexibility at temperatures as low as $-78°C$.

The terpolymer embodied herein is conveniently prepared by polymerizing the monomers mixture in aqueous reaction medium containing a reaction accelerator, the reaction being initiated by a free radical catalyst at a temperature ranging from 35° to 60°C., and at a reaction pressure of about 200 to 500 psi. The aqueous medium may range from 400 to 800 parts per hundred parts by weight of monomer. The aqueous medium will usually contain from about 0.05 to 0.2%, based on monomer weight, of conventional dispersing agent, such as a high molecular weight polyethylene glycol or a hydroxyalkylcellulose (e.g. where alkyl is methyl, ethyl or propyl). A preferred reaction accelerator is 1,1,2-trichloro-1,2,2-trifluoroethane in amounts varying from 10% to 150% by weight of the monomers. (The smaller amounts are operable if the solvent is added incrementally). The preferred initiators are the dialkyl peroxy dicarbonates, particularly diisopropylperoxydicarbonate. For best results the ratio of tetrafluoroethylene to ethylene in the feed monomers will be 1.0 to 1.5:1. The initiator concentration may range from 0.3 to 1% by weight of the monomers. Reaction periods will normally vary from 1 to 4 hours. The terpolymer product is recovered from the reaction medium (by filtration) as discrete beads within the particle size range of about 1 to 3 mm.

The following examples illustrate typically preferred techniques for synthesizing the terpolymer compositions.

EXAMPLE 1

A vertical, two gallon stainless steel autoclave equipped with an agitator is charged with four liters deionized water containing five grams polyethylene glycol, molecular weight 20,000 ("Carbowax 20 M").

To this aqueous medium is added 147 ml of acetone and a solution of 5 grams of diisopropyl peroxydicarbonate initiator in 500 ml of 1,1,2-trichloro-1,2,2-trifluoroethane. The reactor is purged with nitrogen and evacuated, 92 grams hexafluoropropene is added and agitation at 1,000 rpm commenced. The reactor contents are heated to 30°C resulting in a pressure of 40 psig.

Then a portion of an ethylene-tetrafluoroethylene mixture (49% of which is ethylene) is charged to the reactor in sufficient amounts to give a pressure of 300 psig. Pressure is maintained at 300 psig by continuous addition of this monomers mixture until a total of 817 grams is fed. Total reaction time is 63 minutes. The temperature during polymerization ranges from 29° to 37°C. Polymerization rate is 87.5 grams per liter per hour. After the pressure drops to 200 psig, the reactor is vented and cooled. The polymer slurry is filtered, washed with water, and the white solids are dried in an 110°C air open to give 437 grams of terpolymer (48% yield) composed of copolymerized units constituted of 50% ethylene, 44% tetrafluoroethylene and 6% hexafluoropropylene. Its plasticity number is 2400 mm$^2$. The polymer is molded into tough, flexible, transparent plaques 3 inch × 3 inch × 30 mils thick.

EXAMPLE 2

In this procedure, a 2 gallon horizontal reactor is used with agitator speed of 80 rpm. The tetrafluoroethylene to ethylene ratio in the feed is 1.5:1. The hexafluoropropene is fed incrementally. The initiator (di (2-methylpentanoyl) peroxide, 50% in mineral spirits) is fed incrementally in mixture with 132 g. of trichlorotrifluoroethane and 73g. acetone. The reaction pressure is 500 psi and temperature is 45°C. After 2.3 hours, a 40% yield of granular polymer is obtained, average polymerization rate, 31g./liter/hr. The polymer is composed of the polymerized units 50% Et, 45% TFE, and 5% HFP; plasticity number is 3200 mm$^2$.

The following data is a summary of the physical and thermal properties of examples of terpolymers of this invention (those marked with an asterisk) compared to polymers not having the specific composition claimed, thereby demonstrating the overall superiority of the polymers embodied herein, such comparisions being shown by the summary of results in Tables I – IV.

EXAMPLE 1*

Terpolymer of 50% Et, 44% TFE, 6% HFP, plasticity number, 2400 mm$^2$. (Conditions of preparation set forth above.)

EXAMPLE 2*

Terpolymer of 50% Et, 45% TFE, 5% HFP, plasticity number 3200 mm$^2$. (Conditions of preparation set forth above.)

EXAMPLE 3*

Terpolymer of 53% Et, 43% TFE, 4% HFP, plasticity number 2800 mm$^2$; dielectric constant, 2.6; dissipation factor, <1×10$^{-4}$. (Prepared according to procedure of Example 1 except no dispersing agent used.)

EXAMPLE 4*

Terpolymer of 53% Et, 44% TFE, 3% HFP, plasticity number, 2030 mm$^2$. (Prepared according to procedure of Example 3 except that CH$_3$Cl used in place of acetone as modifier.)

EXAMPLE 5

Copolymer of 50% ET and 50% TFE, plasticity number, 2300 mm². (Prepared according to procedure of Example 3 with acetone as modifier.)

EXAMPLE 6

Copolymer of 53% Et and 47% TFE, plasticity number, 2300 mm².

EXAMPLE 7

Copolymer of 49% Et, 51% TFE, plasticity number, 6000 mm², similar to polymer sold commercially as "Tefzel" fluoropolymer by E. I. DuPont de Nemours Co.

EXAMPLE 8

Terpolymer of 50% Et, 48% TFE, 2% HFP, plasticity number, 3900 mm². (Prepared using incremental addition of HFP monomer and initiator to a horizontal reactor.)

EXAMPLE 9

Terpolymer of 50% Et, 23% TFE, 27% HFP, plasticity number, 2600 mm² at 225°C. (Prepared using a 3/1/2 mole ratio of Et/TFE/HFP monomers according to procedure of Ser. No. 308,073, filed Nov. 20, 1972.)

TABLE I

| Example No. | Melting Point, (°C) | THERMAL PROPERTIES Heat Stability 270°C | 200°C | TMA Penetration Temperature, (°C) |
|---|---|---|---|---|
| 1* | 285 | Good | | 246 |
| 2* | 256 | Good | 0.39% Wt. loss in 2 weeks | |
| 3* | 275 | | | |
| 4* | 271 | | | 226 |
| 5 | 291 | | | 251 |
| 6 | 285 | | | |
| 7 | 274 | | | 205 |
| 8 | 276 | Fair | | |
| 9 | 137 | | | 140 |

(Blanks in the table indicate that the measurement was not made.)

TABLE II

| Exp. No. | Tensile Strength (break), psi | MECHANICAL PROPERTIES Elongation, % | Toughness psi - % | Impact Strength ft. - lbs in² | Energy to Break ft. - lbs. |
|---|---|---|---|---|---|
| 1* | 9230 | 240 | $2.2 \times 10^6$ | | |
| 2* | 7900 | 330 | $2.6 \times 10^6$ | | |
| 3* | 7310 | 270 | $2.0 \times 10^6$ | 856 | 6.2 |
| 4* | 7030 | 240 | $1.7 \times 10^6$ | | |
| 5 | 7990 | 180 | $1.4 \times 10^6$ | | |
| 6 | 8200 | 160 | $1.3 \times 10^6$ | 685 | 5.6 |
| 7 | 4740–6000 | 100–280 | $0.47–1.7 \times 10^6$ | 542 | 3.3 |
| 8 | 7260 | 325 | $2.4 \times 10^6$ | | |
| 9 | 2200 | 280 | $6.1 \times 10^5$ | | |

The following Table III shows the effect of hexafluoropropene constituency on the modulus characteristics of various polymers compared to that embodied in the present invention. *

TABLE III

| Example No. | Polymer Composition, % Et | TFE | HFP | Modulus, psi (a) |
|---|---|---|---|---|
| 10 | 50 | 23 | 27 | $2.5 \times 10^4$ |
| 11 | 50 | 30 | 20 | $5.7 \times 10^4$ |
| 12 | 50 | 50 | 0 | $1.6 \times 10^5$ |
| Tefzel-200 | 49 | 51 | 0 | $1.5 \times 10^5$ |
| 13* | 52 | 40 | 8 | $1.3 \times 10^5$ |

(a) initial slope of stress-strain curve of microtensile specimen.
Tefzel-200 may contain a small amount of a third monomer (unknown)

The following Table IV shows that increasing the hexafluoropropene content increases the polymer's ability to resist stress-cracking failure at elevated temperatures.

TABLE IV

| Example No. | STRESS-CRACKING AT 200°C. Polymer Composition, % Et | TFE | HFP | Stress-cracking observation (b) |
|---|---|---|---|---|
| 12 | 50 | 50 | 0 | Failed in 5 minutes |
| 14 | 50 | 48 | 2 | Failed in 5 minutes. |
| 15* | 52 | 45 | 3 | Failed in 2 hours |
| 16* | 52 | 43 | 5 | No cracks in 24 hrs. |
| 17* | 50 | 42 | 8 | No cracks in 24 hrs. |

(b) Microtensile dumbbell bent 180° in brass channel and placed in a 200°C. air oven.

The described combination of valuable properties of the present polymeric compositions gives them a wide range of scientific and industrial uses where their strength, toughness, solvent and chemical resistance, low dielectric constant and other characteristics are advantageous, for example, as jacketing for cable for the transmission of electrical energy; for other wire insulation, for coatings for metals that are resistant to chemicals and weathering; for tubing, film, molded components such as seals, o-rings and gaskts, tank liners and the like. For some uses where a material having a higher load bearing capacity is desired, such as in wire insulation, the terpolymer can be crosslinked by conventional means, for instance, by the application of high energy radiation, such as by irradiation with high energy electrons, e.g., 1–2 MEV, 12–30 megarads, or by chemical crosslinking using known curing agents such as organic peroxides exemplified by dicumyl peroxide. The incorporation of conventional fillers in the terpolymer, either in non-crosslinked or crosslinked condition, will also raise the softening point. Conventional fillers such as carbon black, particulate fiberglass, silica, silicates such as calcium or lead silicate, pigments such as titanium dioxide and zinc oxide, in amounts of about 5 to 20 parts per hundred parts by weight of terpolymer, may be incorporated therein by conventional milling and compounding operations. It is significant that heat stabilizers are not needed because of the polymer's inherent thermal stability.

We claim:

1. A high-modulus, nonelastic, tough, flexible, thermally stable, solvent resistant, high molecular weight, thermoplastic terpolymer composed of copolymerized units of, in mole percent, from 45% to 55% ethylene, from 40% to 50% tetrafluoroethylene, and 3% to 9% hexafluoropropylene, said terpolymer being obtained by the copolymerization of the monomers in aqueous medium containing in admixture 0.3 to 1%, based on monomers weight, of dialkyl peroxy dicarbonate as initiator and 10% to 150%, based on monomers weight, of 1,1,2-trichloro-1,2,2-trifluoroethane as reaction accelerator.

2. A terpolymer according to claim 1 wherein the hexafluoropropylene is 3% to 6%.

3. A terpolymer according to claim 1 wherein the combined amount of tetrafluoroethylene and hexafluoropropylene is from 48 to 52%.

4. A terpolymer according to claim 1 composed of 50% ethylene, 44% tetrafluoroethylene, and 6% hexafluoropropylene.

5. A terpolymer according to claim 1 composed of 50% ethylene, 42% tetrafluoroethylene, and 8% hexafluoropropylene.

6. A terpolymer according to claim 1 composed of 52% ethylene, 43% tetrafluoroethylene and 5% hexafluoropropylene.

7. A terpolymer according to claim 1 composed of 52% ethylene, 40% tetrafluoroethylene and 8% hexafluoropropylene.

8. A terpolymer according to claim 1 composed of 53% ethylene, 43% tetrafluoroethylene, and 4% hexafluoropropylene.

9. A terpolymer according to claim 1 in which the initiator used in the copolymerization is diisopropylperoxydicarbonate.

10. A terpolymer according to claim 9 wherein the hexafluoropropylene is 3% to 6%.

11. A terpolymer according to claim 9 wherein the combined amount of tetrafluoroethylene and hexafluoropropylene is from 48 to 52%.

12. A terpolymer according to claim 9 composed of 50% ethylene, 44% tetrafluoroethylene, and 6% hexafluoropropylene.

13. A terpolymer according to claim 9 composed of 50% ethylene, 42% tetrafluoroethylene, and 8% hexafluoropropylene.

14. A terpolymer according to claim 9 composed of 52% ethylene, 43% tetrafluoroethylene and 5% hexafluoropropylene.

15. A terpolymer according to claim 9 composed of 52% ethylene, 40% tetrafluoroethylene and 8% hexafluoropropylene.

16. A terpolymer according to claim 9 composed of 53% ethylene, 43% tetrafluoroethylene and 4% hexafluoropropylene.

* * * * *